April 8, 1969 H. H. GRASSL 3,437,168
AIR BEARING FOR PHOTOGRAMMETRIC TRACING TABLE
Filed March 8, 1967
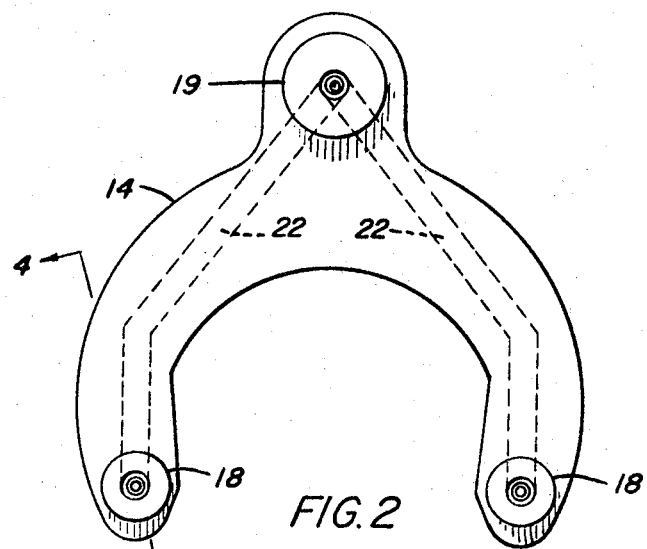
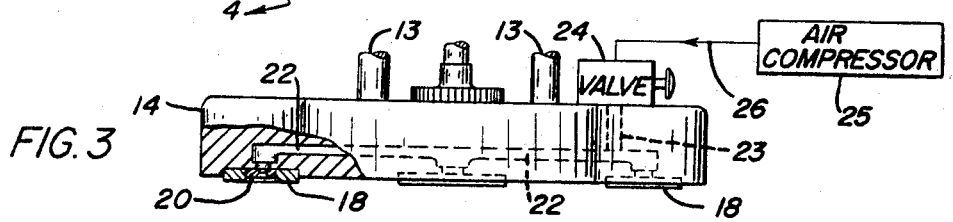
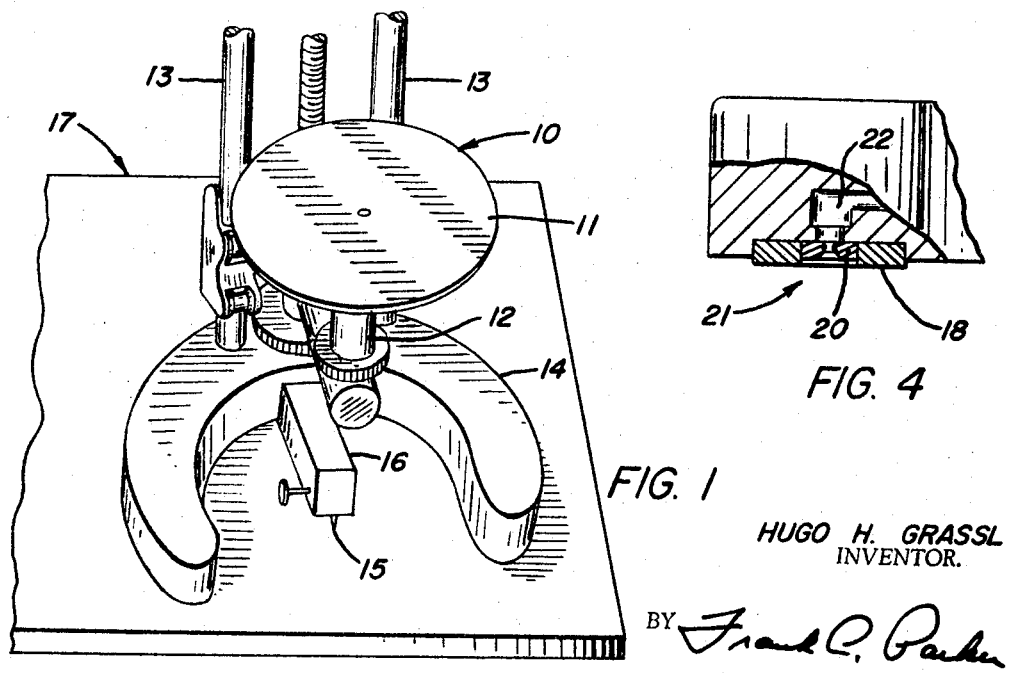
HUGO H. GRASSL
INVENTOR.
BY Frank C. Parker
ATTORNEY April 8, 1969  H. H. GRASSL  3,437,168
AIR BEARING FOR PHOTOGRAMMETRIC TRACING TABLE
Filed March 8, 1967  Sheet 2 of 2

HUGO H. GRASSL
INVENTOR.

BY *Frank C. Parker*

ATTORNEY

United States Patent Office 3,437,168
Patented Apr. 8, 1969

3,437,168
AIR BEARING FOR PHOTOGRAMMETRIC TRACING TABLE
Hugo H. Grassl, Greece, N.Y., assignor to Bausch & Lomb Incorporated, Rochester, N.Y., a corporation of New York
Filed Mar. 8, 1967, Ser. No. 621,503
Int. Cl. B60v *1/00*
U.S. Cl. 180—125                                   2 Claims

ABSTRACT OF THE DISCLOSURE

An apparatus for map plotting instruments of the type that travel over a plane mapping surface and having hydrostatic, air-lubricated bearing rest pads utilizing air pressure to raise the instrument out of physical engagement with the plane surface thereby allowing the instrument to be moved with negligible friction and wear of the bearing rest pad.

Background of the invention

This invention relates to a photogrammetric tracing table and more particularly it relates to improvements in the bearing structure whereon the table is supported.

In the production of maps, charts and the like from aerial photographs, stereo-plotting devices are utilized similar to the instrument shown in FIGURE 8 of U.S. Patent 2,737,846 issued to R. K. Bean, Mar. 13, 1956. Plotting devices of this type include a tracing table, indicated at T in the cited patent, which is moved over a mapping surface such as a drafting paper to produce a map from the aerial photograph projected from above the tracing table.

The tracing table base is generally constructed in a horseshoe shape with three self-aligning adjustable agate foot pads located in the bottom thereof. These pads serve as a sliding bearing surface and travel over the mapping surface during operation of the tracing table. In the past, designers have tried many combinations of bearings including ball bearing casters, all of which proved unsatisfactory, to reduce friction. In turning to agate foot pads, the bearing designers attempted to minimize the friction encountered between the foot pads and the mapping surface in order that the tracing table could be moved relatively freely and without unnecessary drag. This drag would cause unwanted buckling of the mapping surface and would result in an erratic or jerky movement of the tracing table causing errors in the map being plotted. A minimum friction condition was difficult to obtain with standard bearing constructions or with the agate foot pads due to factors such as variations in the surface characteristic of the mapping surface as well as changes in the weight of the tracing table T, all of which affected the functional drag between the bearing surface and the mapping surface.

Summary of the invention

To alleviate this problem, I have incorporated a plurality of air bearing rest pads into the base of the tracing table, each pad containing at least one gas discharge orifice. The several orifices are then connected, by internal gas passages, to a normally closed valve, located on the base of the tracing table, which controls a supply of pressurized gas to the several orifices. As a result of this new and novel combination, a frictionless air bearing is formed between the tracing table and the mapping surface resulting in the table being lifted off the mapping surface a negligible distance and allowing it to "float" over the mapping surface on a thin film of air when moved by the operator. While the air bearing is in effect, the operator is able to move the tracing table with negligible friction and without buckling of the mapping surface thereby eliminating the beforementioned jerky movement of the tracing table.

In view of the above summary it is an object of this invention to provide a new and novel tracing table which operates with air lubricated bearings contained in the base thereof and further provides means located on the base to control the air bearing.

Another object is to provide a new and novel tracing table that is relatively easy to move over a mapping surface with negligible friction and without leaving trace markings thereon.

Still another object is to provide a new and novel tracing table wherein the surface characteristic of the drawing paper or other mapping surface is unimportant to the operation of the tracing table.

Yet another object is to provide a new and novel tracing table wherein the base consists of a plurality of parts, each having a distinctive function.

A further object is to provide a new and novel tracing table wherein the base is a generally horseshoe shaped three-part structure with protuberant rest pads self-contained in the lower part of the base and containing a gas control valve located thereon for hand actuation by the tracing table operator.

Another object is to provide new and novel means whereby an existing tracing table may be converted to one having air bearings, said novel means consisting of a plurality of positioning indentations located on the upper surface of the intermediate member to accomodate the feet of an existing tracing table.

Further objects and advantages will be found in the novel details of construction, combinations and arrangement of the parts of this invention by referring to the specification herebelow and the accompanying drawings.

Brief description of the drawings

FIGURE 1 is a general perspective view of a photogrammetric tracing table,

FIGURE 2 is a bottom view of the base of the tracing table shown in FIGURE 1,

FIGURE 3 is an end view of the base of the tracing table, partly shown diagrammatically and in section, FIGURE 4 is an enlarged section of a bearing rest pad taken along line 4—4 of FIGURE 2.

Description of preferred embodiment

Figure 5:
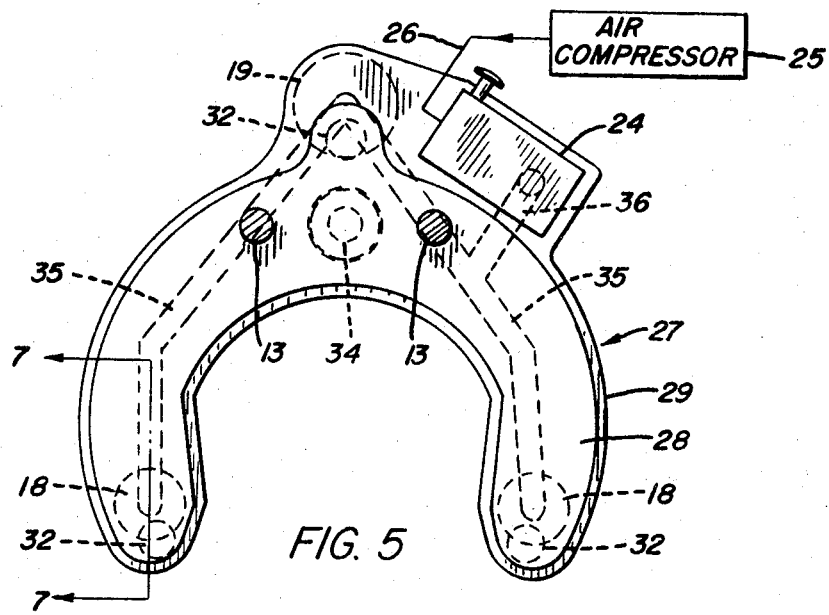
FIGURE 5 is a top view partly in section of a modification of the invention.

A photogrammetric tracing table, embodying my invention, is shown generally by numeral 10 in FIGURE 1 of the drawings and comprises, among other things, a circular disc 11 attached to a bracket 12 which is slideably mounted on two parallel vertical mounting rods 13 which are fastened to a horseshoe shaped base 14. A tracing pencil 15 is fixed in a pencil support 16 which is attached to the base 14 of the tracing table 10. During operation, the tracing table 10 is moved over a mapping surface, shown generally as numeral 17, to produce a contour map from a pair of aerial photographs which are projected from above the tracing table by suitable projection equipment.

Referring now to FIGURE 2, there is shown a bottom view of the tracing table base 14 which is generally formed in a bifurcated horseshoe shaped configuration. Located at the bifurcated ends of the base 14 are two rest pads 18 with a third and somewhat larger rest pad 19 being located near the apex of the bifurcated parts. The rest pads 18 and 19 are generally circular in shape with a hole drilled through the center thereof and are formed extraneously from stainless steel or some other suitable material. However tests have shown that shapes other than circular, such as rectangular, square, triangular, to name a few, function as well as the circular shape.

Located in the center of each rest pad 18 and 19 is a circular orifice element 20, formed of brass or some other suitable material, press fitted into the hole drilled in the center of the rest pads 18 and 19. The width of the orifice element 20 may be the same as the rest pads 18 and 19 or it may be formed of a smaller width as shown in FIGURE 4.

With this latter construction, a pocket 21 is then formed when the orifice 20 is press fitted into the rest pads 18 and 19. From experimentation it has been found that a pocket depth of from 4 to $6 \times 10^{-4}$ inches gives a stable, stiff bearing while a higher pocket depth resulted in a large volume of air in the pocket which responds more slowly to any changes in load or pressure and results in an unstable bearing. It has also been found from experimentation that the use of a pocket 21 is not necessary in order to have a functional air bearing but such a pocket 21 results in a more stable air bearing which in turn results in a smoother operating tracing table.

While the rest pads 18 and 19 have been described as being formed extraneously to the base 14, they may be formed integral therewith during the casting of the base 14 which would eliminate the necessity of press fitting the rest pads 18 and 19 into the base 14. In either case it is only necessary that the rest pads be coplanar in order that the air bearing function properly.

The orifices 20 are connected to each other by means of horizontal internal gas passages 22 formed, by any well known means, in the base 14 when it is cast in its horseshoe shape. The horizontal gas passages 22 are connected by a vertical gas passage 23 to a control valve shown diagrammatically in FIGURE 3 by numeral 24, said valve being mounted by well known means on the top surface of the base 14. While it is preferred to have the control valve 24 mounted in the position shown in FIGURE 3 on the base 14, in order that the operator of the tracing table 10 may be able to hand actuate said valve, it may also be mounted at some remote location where it could be actuated by other means such as the operators foot or knee.

The control valve 24 is a normally closed type, that is opened by the tracing table operator and serves as the means whereby the operator controls the flow of gas to the bearing rest pads 18 and 19. The gas supply referred to in the claims as an extraneous gas supply is obtained by a remotely located compressor 25, or pressurized storage tanks (not shown in the drawings) supplying air at a constant pressure through a pressure line 26 to the control valve 24. It has been found from experimentation that a gas pressure of 30 to 100 p.s.i.g. results in a satisfactory air bearing.

To operate the air bearing most efficiently an external supply of clean, reasonably dry, constant pressure air is required which dictates that an air dryer, various air filters and a pressure regulating valve with a pressure gauge be included in the air circuit. These components are generally supplied as a standard part of any commercial air compressor and therefore are not shown in FIGURE 3. However, should the bearing air supply be obtained from some other extraneous source, such as air, or nitrogen tanks, then such components would be of course installed in the system upstream of the control valve 24 in order to obtain the required clean, dry, constant pressure gas supply.

Figure 6:
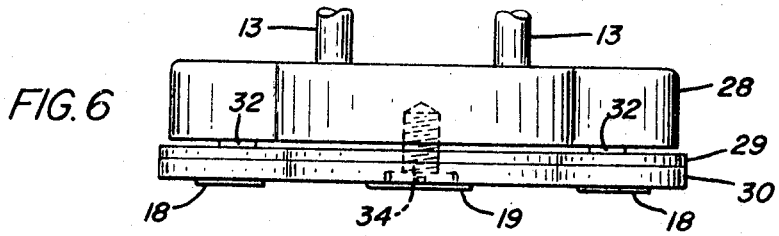
FIGURE 6 is an end view of the modification shown in FIGURE 5.
Figure 7:
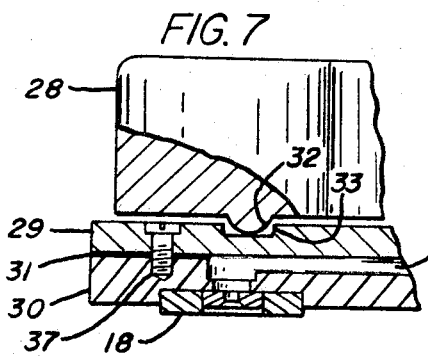
FIGURE 7 is an enlarged sectional view taken along line 7—7 of FIGURE 5.

Turning now generally to FIGURES 5, 6 and 7 there is shown a modification of my invention whereby an existing tracing table without air bearings may be converted to a table with air bearings.

The tracing table base, embodying this modification, is shown generally by the numeral 27 in FIGURE 5 and consists primarily of an upper member 28, an intermediate member 29 and a lower member 30. Interspaced between the intermediate member 29 and the lower member 30 is a gasket 31 along with a series of cap screws 37 serving to fasten the intermediate member 29 to the lower member 30.

The upper member 28 may consist of a standard tracing table with all the necessary equipment attached as shown in FIGURE 1 but without the bearing rest pads 18 and 19.

Included on the standard tracing table would be three agate foot pads 32 or some other protrusion on the lower surface which act as the bearing means for movement of the tracing table. These foot pads 32 are contained in a corresponding plurality of positioning indentations, one of which is shown in FIGURE 7 as numeral 33. The positioning indentations 33 serve as the means whereby the upper member 28 may be accurately positioned on the intermediate member 29 and are formed on the intermediate member 29 to be aligned with the foot pads 32 employed on the various tracing tables manufactured.

After the foot pads 32 are aligned in their respective positioning indentations 33, a suitable coupling means such as a cap screw 34 is inserted, in a previously drilled hole, through the lower member 30 and the intermediate member 29 and engaged in a drilled and tapped hole contained in the upper member 28. The cap screw 34 thereby serves as the means for fixedly connecting the lower member 30 and the intermediate member 29 to the upper member 28.

Formed in the lower member 30 is a series of horizontal recesses shown in FIGURE 5 as numeral 35 which serve to connect the respective orifices together in a manner similar to the horizontal gas passages 22 shown in FIGURE 2. When the intermediate member 29 is fixed to the lower member 30, with the gasket 31 interposed therebetween, by means of the cap screw 34, the horizontal recesses 35 become in effect gas passages.

Figure 8:
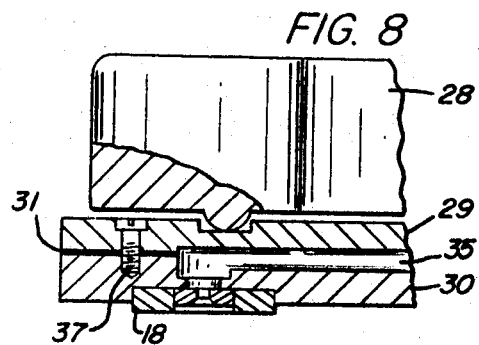
FIGURES 8 and 9 are similar to FIG. 7 wherein modifications of the invention are shown.

FIGURE 8 shows a modification of the device shown in FIGURE 7 whereby the recesses 35 are formed in the intermediate member 29 as well as the lower member 30 which would be equally effective.

Figure 9:
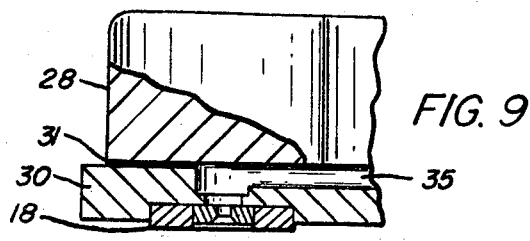

FIGURE 9 is another variation in the structure of FIGURE 7 whereby the foot pads 32 are removed from the upper member 28 which is then fastened directly to the lower member 30 by the cap screw 34. The gasket 31 is interposed between the members as in FIGURE 7 and serves as the means to effect a proper air seal between the members.

The intermediate member 29 and lower member 30 are formed in the general shape shown in FIGURE 5 thereby allowing the control valve 24 to be mounted by any well known means to the upper surface of the intermediate member 29. When the modification shown in FIGURE 9 is utilized the control valve 24 would be mounted on the upper surface of the lower member 30 since, in this form, the intermediate member 29 is not utilized.

The lower member 30 has contained therein the plurality of rest pads 18 and 19 in the same manner as before described and shown in FIGURES 2, 3 and 4. The lower member 30 also has formed therein a horizontal and vertical connecting gas passage shown in FIGURE 5 as numeral 36 which functions in the same manner as the vertical gas passage 23, shown in FIGURE 3, to connect the respective orifices and gas passages with the control valve 24 and the extraneous air supply.

The modification shown in FIGURE 5 also utilizes the air compressor 25 with the pressure line 26 connecting the air compressor 25 to the control valve 24 as before described.

In utilizing my invention the tracing table operator simply has to grasp the base 14 with his hands on the bifurcated parts of the base. By actuating the control valve 24 with his finger, he is able to introduce constant air pressure from the air compressor 25 into the gas passages 22 and 23 which in turn flows out of the orifices 20 thereby forming a thin film of air or gas between the rest pads 18 and 19 and the mapping surface 17 over which the tracing table is moved. By experimentation it has been found that an air film range of approximately 0.0004 to 0.0015 of an inch thick results in a satisfactory air bearing.

From this it becomes apparent that by the use of air bearings on the tracing table base a negligible friction condition is formed resulting in the tracing table 10 being lifted off the mapping surface 17 and allowing it to "float" over the mapping surface thereby affording a smoother operating tracing table and eliminating the beforementioned jerky movement of the tracing table.

Although only certain forms of the present invention are shown and described herein in detail, other forms are possible and changes may be made in the arrangements and combinations of the parts and in the detailed structures without departing from the spirit and scope of the invention.

I claim:
1. In a photogrammetric tracing table for use on a mapping surface having a generally horseshoe shaped bifurcated base, a gas bearing mechanism characterized by the combination of said base having an upper member, an intermediate member, a lower member, and means for fixedly connecting said members together,
   at least three protuberent rest pads formed on the bottom surface of said lower member, one of said rest pads being located near the end of each bifurcation, and another of said rest pads being located near the apex of said bifurcated base,
   each of said rest pads having a bottom face which is coplanar with the bottom face of each other rest pad, having at least one gas discharge orifice therein,
   said base having a network of gas passages formed therein interconnecting said gas discharge orifices, said passages being cooperatively formed in said intermediate and lower members,
   means cooperatively formed on said upper and intermediate members for accurately positioning said upper member on said intermediate member, and
   means including a normally closed pressure control valve for connecting said gas passages to an externally located source of gas under constant pressure, said valve being located near the apex of said bifurcated base on the upper surface of said intermediate plate member, whereby the tracing table operator is able to hand actuate said control valve during the operation of the tracing table admitting gas to said base and discharging said gas through said orifices forming a gas bearing of constant thickness thereby providing an essentially frictionless interface between said base and said mapping surface and preventing buckling of said mapping surface.

2. A gas bearing mechanism according to claim 1 in which said means for positioning includes a plurality of positioning indentations located on the upper surfaces of said intermediate member.

References Cited
UNITED STATES PATENTS

| | | |
|---|---|---|
| 2,500,055 | 3/1950 | Baker. |
| 2,938,590 | 5/1960 | Barnett _____ 180—125 |
| 3,097,718 | 7/1963 | Jay et al. _____ 180—125 |
| 3,185,238 | 5/1965 | Coates _____ 180—125 |
| 3,209,929 | 10/1965 | Petersen et al. _____ 180—125 X |
| 3,239,024 | 3/1966 | Christian _____ 180—125 |

A. HARRY LEVY, *Primary Examiner.*

U.S. Cl. X.R.

88—24